United States Patent [19]

Hashizume

[11] Patent Number: 4,534,516

[45] Date of Patent: Aug. 13, 1985

[54] DYNAMIC SEPARATOR FOR A GRINDING MILL

[76] Inventor: Iwao Hashizume, 11-1 Shinjyo-cho, Ibaragi-shi, Osaka, Japan

[21] Appl. No.: 620,533

[22] Filed: Jun. 14, 1984

Related U.S. Application Data

[63] Continuation of Ser. No. 346,593, Feb. 8, 1982, abandoned.

[30] Foreign Application Priority Data

Mar. 16, 1981 [JP] Japan .............................. 56-37714[U]

[51] Int. Cl.$^3$ .............................................. B02C 17/16
[52] U.S. Cl. .................................... 241/171; 209/233; 241/172
[58] Field of Search ............ 241/172, 252, 254, 46.02, 241/46.04, 46.11, 46.17, 171; 209/233, 263, 660, 659

[56] References Cited

U.S. PATENT DOCUMENTS

| | | | |
|---|---|---|---|
| 1,449,958 | 3/1923 | Schifferdecker | 241/254 X |
| 3,311,310 | 3/1967 | Engels et al. | 241/172 X |
| 3,536,266 | 10/1970 | Kaspar et al. | 241/172 |
| 4,382,557 | 5/1983 | Duerr | 241/172 X |

Primary Examiner—Mark Rosenbaum
Assistant Examiner—Joseph M. Gorski
Attorney, Agent, or Firm—Koda and Androlia

[57] ABSTRACT

A dynamic separator for a grinding mill having a stator installed in a stationary manner and a rotor provided on a rotary shaft such that it faces the stator. Between the stator and the rotor is provided a small gap for the passage of processed material in order to separate and discharge the processed material from the dispersion media. The rotor is arranged and configured together with the stator such that the relative position of the rotor rim area and the stator are constantly varied.

2 Claims, 3 Drawing Figures

DYNAMIC SEPARATOR FOR A GRINDING MILL

This is a continuation of application Ser. No. 346,593, filed Feb. 8, 1982, now abandoned.

BACKGROUND OF THE INVENTION

1. Field of the Invention

The present invention relates to dynamic separators for grinding mills and more particularly to dynamic separators for grinding mills designed to prevent the dispersion medium from gathering at the rim of the rotor to thereby minimize the wear of the stator.

2. Prior Art

In dispersion agitators, such as a grain mill, in order to separate the dispersion medium, such as beads, from the processed material, a dynamic separator is used. A dynamic separator is constructed such that a specified space is maintained between the stator fixed to a stationary portion and rotor mounted on the rotary portion so that only the processed material can be discharged through the space. Usually, both the stator and the rotor are made of wear-resisting material.

Such dynamic separators, however, have been defective in that towards the rim area of the disc-form rotor the dispersion medium which has been previously separated or is contained within the material to be processed gathers at the rim of the rotor. Since the dispersion media gathered at the rim of the rotor moves with the rotation of the rotor, the rotor and the stator tend to be quickly worn out. In addition, on the surface of the stator a circular groove is carved along the rotor rim thereby necessitating frequent replacement of the stator.

SUMMARY OF THE INVENTION

It is the primary object of the present invention to provide a dynamic separator for a sand grinding mill, etc. which can prevent the gathering of the dispersion medium towards the rim area of the rotor and which minimizes the wear on the stator.

In accordance with the principles of the present invention, the objects are accomplished by a unique dynamic separator which includes a rotor arranged and configured such that the position of the rotor rim relative to the position of the stator constantly varies.

BRIEF DESCRIPTION OF THE DRAWINGS

The above-mentioned features and objects of the present invention will become more apparent with reference to the following description taken in conjunction with the accompanying drawings wherein like reference numerals denote like elements and in which.

DETAILED DESCRIPTION OF THE INVENTION

Figure 1:
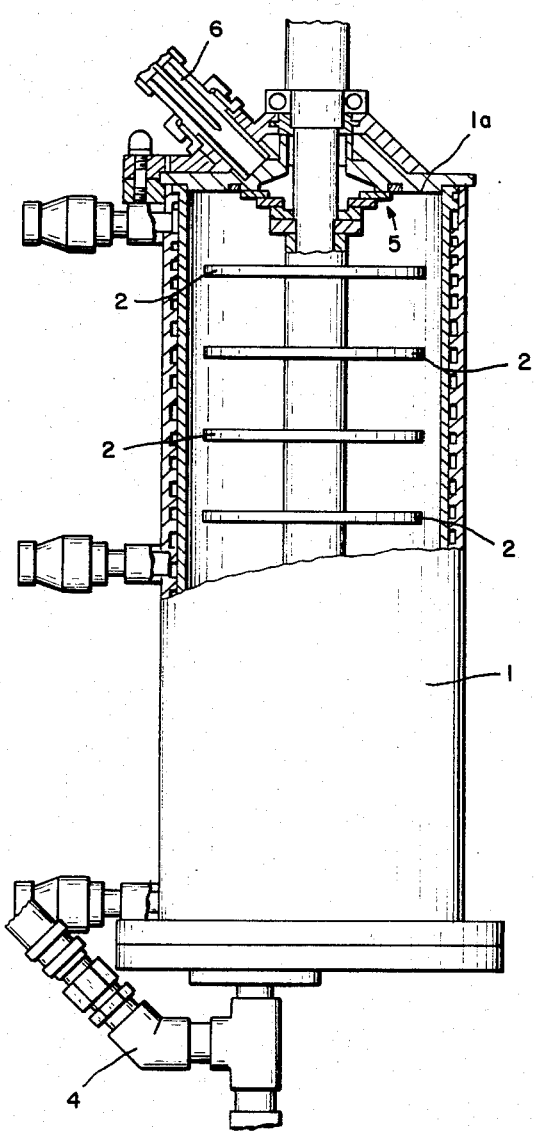
FIG. 1 is a front elevational view, partially in cross section, of a dispersion agitator.

Referring more particularly to the drawings, shown in the figures is a dispersion agitator having the dynamic separator in accordance with the teachings of the present invention. The dispersion agitator (ball mill, grain mill, etc.) is constructed as shown in FIG. 1 and includes a rotary shaft 3 with disc 2 mounted on the rotary shaft 3 is a dispersive agitation tank 1. The dispersion agitator is further constructed to feed the processing material from a feeding port 4 at one side, then to stir it together with the dispersion media, such as beads, steel balls, etc., thereafter to separate the dispersed and stirred processed material from the dispersion media by means of a dynamic separator 5 and to discharge only the processed material from the outlet 6 at the other side. Such dispersion agitators are widely used in the chemical industry for producing paints, pigments, dyes, etc. as well as in other industries for producing food.

Figure 2:
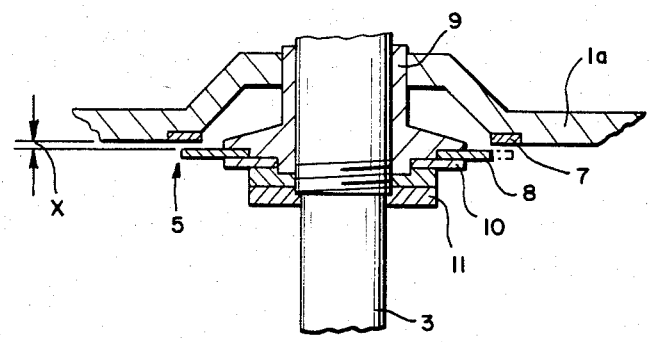
FIG. 2 is an enlarged sectional view of only a portion of the dynamic separator.

As shown in FIG. 2, the dynamic separator 5 is formed by a stator 7 fixed to the top wall 1a of the dispersive agitation tank 1 and the rotor 8 is fixed onto a rotary shaft 3. The stator 7 and the rotor 8 are separated by a specified space X maintained between them and the size of the space X is set at a range so that the dispersion media cannot pass through.

Figure 3:
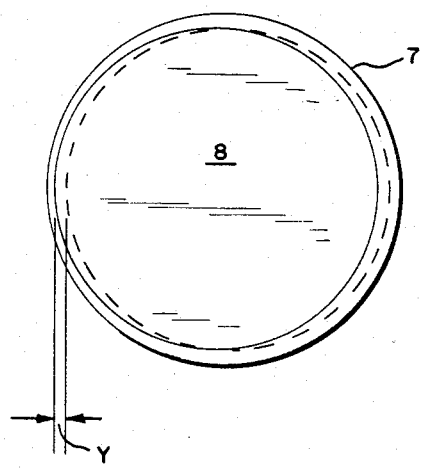
FIG. 3 is a plan view showing the stator and rotor schematically.

In the construction described above, the disc shaped rotor 8 is mounted on the rotary shaft 3 by slightly offsetting the center of the rotor 8 from the center of the rotary shaft 3. In other words, as indicated by the solid line and the dotted line in FIG. 3, the disc-shaped rotor 8 is arranged such that during the rotation of the rotor 8, the relative positions of the rim area of the rotor 8 and stator 7 change constantly. In such a construction, the amount of variation is determined depending upon the extent of the eccentricity of the rotor 8; and in the case shown in FIG. 3, with each rotation of the rotor 8 the whole rim moves as far as Y. Therefore, the extent of eccentricity is limited to a range such that at least the rotor does not go out of the stator 7 and in actuality the extent of eccentricity is set to be about 1 to 2 mm.

The rotor 8 in a disc-shaped form may be mounted eccentrically or the form of the rotor 8 may be changed to some other shape than a circle, such as an ellipse.

In the remainder of the figures, the dispersion agitator and dynamic separator 5 include a sleeve 9 for installing the rotor 8, a keep plate 10 for the rotor 8 and a lock nut for fixing the rotor 8 to the rotary shaft 3.

With the construction of the present invention, wherein the relative positions of the rim area of the rotor 8 and stator 7 change constantly, since the dispersion medium which is separate, from the processed is always eliminated towards the outside, the concentration of the dispersion medium into the rim area of the rotor 8 of the dynamic separator 5 can be avoided. Consequently, wear on the stator surface can be reduced and the forming of a circular groove in the stator surface can be prevented. Furthermore, even if the separated dispersion media is densely distributed over the peripheral area of the rotor 8, causing wear on the stator 7, a deep groove is prevented from being formed in a limited narrow range as in the prior art device. Also, since the dispersion media separated from the processed material is always pushed towards the outside of the rotor 8 and the new mixture flows into that space, the quantitative ratio of the dispersion media in the processed material which can be separated can be reduced as much as possible, thereby improving the efficiency of separation.

From the foregoing description of invention it should be apparent that the dynamic separator according to the present invention has high durability as to wear, particularly groove forming wear in the surface of the stator 7 can be prevented. In addition, the dynamic separator, in accordance with the teachings of the present invention, provides outstanding performance as a separator.

It should be apparent to those skilled in the art that the above described embodiment is merely illustrative of one of the many possible specific embodiments which represent the applications and principles of the present invention. Numerous and various other arrangements may be readily devised by those skilled in the art without departing from the spirit and scope of the invention.

I claim:

1. A grinding mill comprising a dispersive agitation tank and a dynamic separator, said dynamic separator comprising: a stator extending in a horizontal plane and fixed to a top wall of said agitation tank; and a rotor extending in a horizontal plane and located vertically below said stator within said agitation tank and facing said stator with a small predetermined gap between a horizontally extending surface of the stator and a horizontally extending surface of the rotor in order to separate a dispersion medium from a processed material, said rotor having a vertically extending axis of rotation and an outer periphery, wherein a horizontally extending radial distance from one point on said periphery to said axis of rotation is not equal to a horizontally extending radially distance from at least one other point on said periphery to said axis of rotation, so that an overlap of a rim of said rotor relative to a rim of said stator varies constantly.

2. A dynamic separator according to claim 1, wherein said rotor is disc-shaped and provided eccentrically on said rotary shaft.

* * * * *